May 26, 1953     A. J. MAY     2,639,504
BARBER SHEARS
Filed April 28, 1950
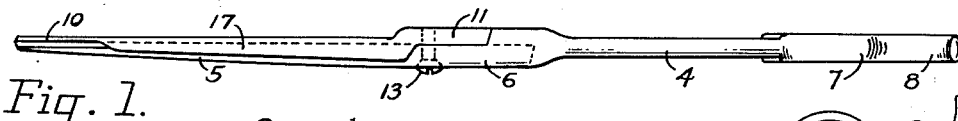
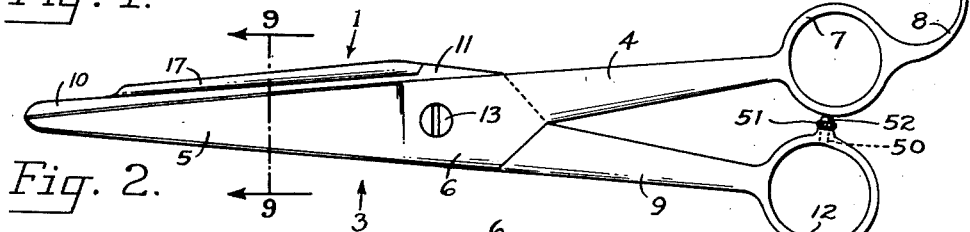
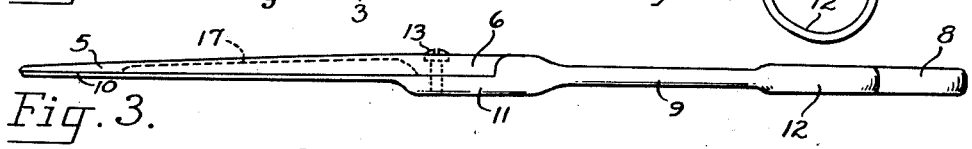
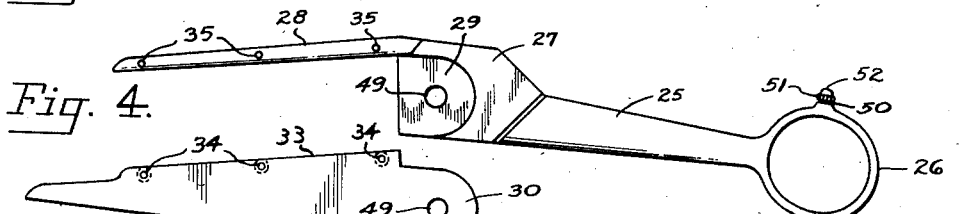
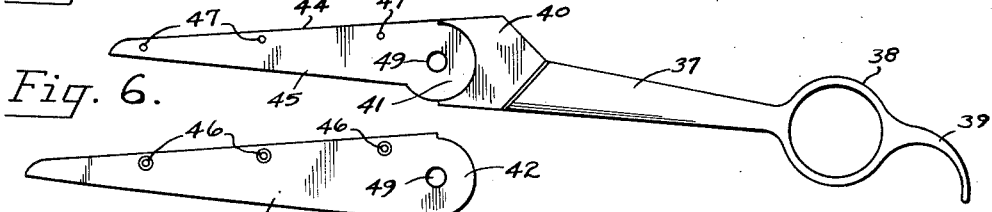
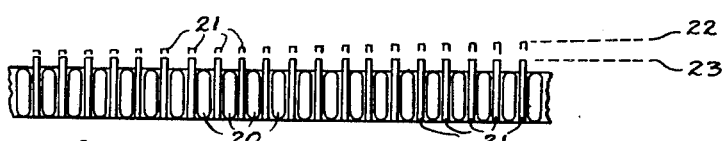
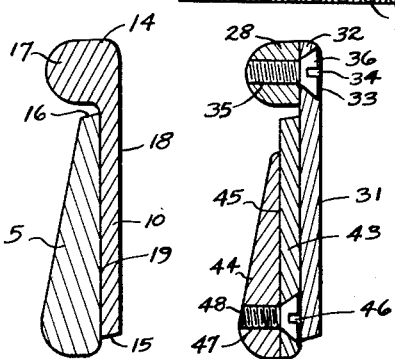
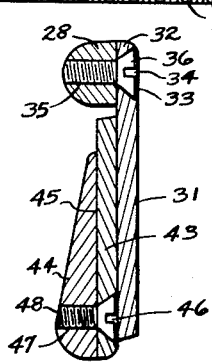
INVENTOR.
Andrew J. May
BY Oliver D. Olson
His Agent Patented May 26, 1953

2,639,504

UNITED STATES PATENT OFFICE 2,639,504

BARBER SHEARS

Andrew J. May, Longview, Wash.

Application April 28, 1950, Serial No. 158,734

4 Claims. (Cl. 30—260)

1

This invention pertains to barber shears, and relates particularly to the novel construction of a barber shears by which is afforded closer and more even cutting than has been attained heretofore.

In barber and other shears of common construction, the pair of cutting blades are each of substantially triangular cross section with the thick edges extending laterally in opposite directions from the cutting plane. The cross sectional dimensions decrease progressively toward the point of the shears. The primary disadvantage of such construction resides in the fact that the thick edge provided on the cutting blade which normally faces the surface to be cut or trimmed holds the cutting edge away from said surface and thereby prevents close cutting. Moreover, the closeness of cutting obtained with such shears decreases progressively as the cross sectional dimensions of the cutting blades increase toward the handle.

It is a principal object of the present invention, therefore, to provide a shears construction in which the face of the blade normally positioned adjacent the surface being cut extends substantially parallel with the cutting plane.

Another important object of this invention is the provision of a shears in which the reinforcing portions of both blades extend laterally outward away from the face of the blade normally arranged adjacent the surface to be cut.

A further important object of the present invention is to provide a shears having a pair of cutter members detachably secured to supporting extensions of the shears body, said supporting extensions projecting laterally away from the face of the cutter member normally arranged adjacent the surface to be cut or trimmed.

A further object is the provision of a shears construction in which detachable cutter members provide abutting bearing surfaces, whereby to obviate wear of the abutting body sections of the shears in the area of their common pivot connection.

A still further object of this invention is the provision in a shears of adjustable cushioning means whereby to silence the action of said shears and to accommodate adjustment of the blades as the cutting edges of the latter are reduced in width after sharpening.

These and other objects and advantages of the present invention will appear from the following detailed description taken in connection with the accompanying drawing, in which:

Figure 1 is an edge view of a shears embodying the features of this invention, as viewed in the direction of arrow 1 in Figure 2;

Figure 2 is a plan view of the shears shown in Figure 1;

Figure 3 is an edge view of the shears as viewed in the direction of arrow 3 in Figure 2;

Figure 4 is a plan view showing one section of the body of a modified form of shears embodying the features of the present invention;

Figure 5 is a plan view of a cutter member adapted for detachable mounting upon the body section shown in Figure 4;

Figure 6 is a plan view of a second body section proportioned for cooperative engagement with the body section shown in Figure 4;

Figure 7 is a plan view of a cutter member adapted for detachable mounting upon the body section shown in Figure 6;

Figure 8 is an enlarged fragmentary plan view of a comb having hairs extending between the teeth thereof and illustrating by dotted lines the action of the shears of the present invention and the action of shears of prior construction;

Figure 9 is an enlarged sectional view taken along the line 9—9 in Figure 2; and Figure 10 is an enlarged sectional view of the shears assembled from the separate parts shown in Figures 4, 5, 6 and 7 and taken along a line located at substantially the same position as the section line producing Figure 9.

Stated broadly, the present invention comprises a shears constructed in such manner as to provide a cutting plane disposed substantially parallel to the face of the blade which normally lies adjacent the surface upon which the shears is being used.

Referring to Figures 1, 2, 3 and 9, the shears illustrated therein is formed of two main elongated sections. One of said sections comprises a handle 4 and a cutter blade 5 formed at opposite ends of a central pivot section 6. The terminal end of handle 4 is fashioned into a finger loop 7 and an extending finger rest 8, in manner well-known in the art. The cutter blade 5 is of substantially triangular cross section, as shown in Figure 9, and is of conventional construction.

The other of said two main sections of the shears comprises a handle 9 and a cutter blade 10 formed at opposite ends of the central pivot section 11. Finger loop 12 is provided at the terminal end of handle 9. The two central pivot sections 6 and 11 are proportioned and arranged to lie in mutual abutment and are secured together pivotally with pivot screw 13 or by other means well-known to those skilled in the art.

Cutter blade 10 differs in construction from cutter blade 5. Referring particularly to Figure 9 of the drawing, the main portion of cutter blade 10 is formed as a relatively thin section of substantially uniform thickness throughout its cutting area. The edge 14 of blade 10 opposite the cutting edge 15 extends laterally beyond the cutting edge 16 of blade 5. Projecting normally from the plane of blade 10 adjacent the edge 14 is an elongated rib 17 which provides structural strength and rigidity for blade 10. Said rib projects in the direction of blade 5 rather than away from the latter in the manner of conventional shear blades, whereby to provide a flat cutting face 18 on blade 10 disposed substantially parallel to the cutting plane 19 of the shears. Said cutting plane is defined by the abutting edges of the two blades 5 and 10, respectively. The rib 17 extends longitudinally from or adjacent the pointed end of the blade 10 to a point adjacent the center section 11, as best shown in Figure 2.

Referring particularly to Figure 8 of the drawing, it is the general practice in the barbering trade to employ a comb 20 in drawing up the hair 21 preparatory to cutting or trimming. The open shear blades are then laid against the comb and drawn together to make the desired cut. The conventional shears is provided with two cutter blades both of which have the general cross sectional shape of blade 5 shown in Figure 9. The cutting edges of said blades are disposed adjacent each other to produce a shearing action, while the thick end of each blade projects laterally from opposite sides of the cutting plane. The thickened end of the blade which is disposed adjacent the comb 20 thereby causes the cutting edge of said blade to be spaced from the comb and thus prevents close cutting. Moreover, the diminishing thickness of the blades causes the hair 21 to be cut along a plane 22 which is not parallel to the comb.

The shears construction of the present invention overcomes the disadvantages of conventional shears in the provision of the blade 10 which presents a flat face 18 for use adjacent the comb 20. Not only does this shears construction afford closer cutting, but it also results in the cutting of hair 21 along a plane 23 which extends parallel with the plane of the comb. All of the hairs are thereby cut to equal lengths, whereby to present a more pleasing appearance.

The modified shears construction illustrated in Figures 4, 5, 6, 7 and 10 provides for the detachment of the cutter blades to facilitate sharpening and to permit replacement of the blades. Said shears comprises a pair of body members shown in Figures 4 and 6, respectively, and their cooperating cutter blades shown in Figures 5 and 7, respectively.

Referring to Figure 4 of the drawing, the body member comprises a handle 25 having the usual finger loop 26, an intermediate pivot section 27 and a projecting blade support 28. The pivot section 27 is provided with a central recessed portion 29 for receiving the complementary shaped end 30 of the detachable flat blade 31 shown in Figure 5. The blade support 28 is offset laterally in such manner that its inner surface 32 lies inwardly from and opposes the plane of the recess 29, a distance equal to the thickness of blade 31, as explained hereinafter. Blade 31 is provided with an intermediate projecting section 33 which is proportioned and arranged to abut against the inner face 32 of the blade support 28. Countersunk holes 34 provided in said projecting section 33 register with complementary tapped holes 35 in the blade support 28. The blade and blade support are thus secured together by means of screws 36.

Referring to Figure 6 of the drawing, the second body member comprises a handle 37 having a finger loop 38 and finger rest 39. The intermediate pivot section 40 is provided with a central recess 41 proportioned and arranged to receive the complementary end 42 of cutter blade 43 shown in Figure 7. The elongated blade support 44 extends forwardly from the central pivot section 40 and is arranged with its inner face 45 lying in the plane of the recess 41. The blade support is narrower in width than the cutter blade 43, as best shown in Figure 10, whereby to permit sharpening of the latter. Countersunk holes 46 in blade 43 registers with complementary tapped holes 47 in the blade support 44 whereby the said parts are secured together detachably by means of screws 48. A hole 49 is provided centrally in each of the sections 29, 30, 41 and 42 for complementary registration and alinement when assembled, whereby to receive a pivot pin or screw for securing the parts together, in manner similar to the function of screw 13 described hereinbefore.

The portion 29 of the central section 27 is recessed from the latter a depth substantially equal to the thickness of blade 31. In similar manner, portion 41 is recessed from the inner face of the intermediate section 40 a depth substantially equal to the thickness of blade 43. Thus, when the shears is assembled, as described hereinafter, the ends 30 and 42 of blades 31 and 43, respectively, are placed in mutual abutment and function as pivot bearings for the shears. It is apparent that since the said pivot bearings form a part of the detachable blades, the intermediate central sections 27 and 40 are not subjected to wear and the body members of the shears are rendered usable for much longer durations of time than obtainable heretofore.

The assembly of the shears shown in Figures 4, 5, 6 and 7 is as follows: Blade 31 is arranged with its end 30 deposited in the recess 29 and the projecting section 33 abutting against the inner face of the blade support 28. Screws 36 are then secured in the alined holes 34 and 35, as previously explained. Blade 43 is also arranged with its end 42 positioned in recess 41 and screws 48 secured in the alined holes 46 and 47. The body member shown in Figure 6 is then turned 180° about its longitudinal axis and placed in registry with the body member shown in Figure 4, to form an assembly substantially as shown in Figure 2. A screw or pin (not shown) is then inserted in the alined holes 49 whereby to secure the two body members together.

In both of the modifications illustrated in the appended drawing provision is made both for silencing the action of the shears and for adjusting the cutter blades after the latter are reduced in width by sharpening. Referring to Figures 2 and 4, a screw 50 is proportioned and arranged for threaded engagement in a tapped hole formed in the finger loop 12 or 26 at the point where the latter contacts the loop 7 or 38 of the companion body member. The screw 50 is provided with a knurled or squared head 51 which is recessed centrally to receive a rubber cushion 52.

As the cutter blades are sharpened occasionally, they are reduced in width and thereby do not close completely at their pointed ends. The screw 50 is turned by means of the head 51 in such manner as to reduce the space between the adjacent finger loops and thus cause the pointed ends of the cutter blades to come into registry. The rubber cushion 52 eliminates the disturbing metallic sound ordinarily obtained as the finger loops strike together during manipulation of the shears. As new blades are installed in the modification shown in Figures 4, 5, 6 and 7, the screw 50 is drawn outwardly of its tapped hole to increase the spacing between the finger loops.

It is to be understood that the blades and reinforcing rib members of the shears described hereinbefore will be provided with the proper degree of set during manufacture, as will be apparent to those skilled in the art. It will also be apparent to those skilled in the art that various modifications and changes may be made in the structures described hereinbefore without departing from the scope and spirit of the present invention. Accordingly, it is to be understood that the foregoing description is merely illustrative and is not to to be considered in a limiting sense.

Having now described my invention and the manner in which the same may be used, what I claim as new and desire to secure by Letters Patent is:

1. A barber shears comprising opposed cutter blades connected together pivotally at one of their ends, one of said cutter blades being flexibly thin throughout its cutting area and having a plane working face disposed substantially parallel to the cutting plane of said shears, said blade having a reinforcing rib extending longitudinally thereof adjacent the edge opposite the cutting edge, said rib projecting laterally across said cutting plane in the direction of said second cutter blade, the plane working face being adapted to abut against a comb during barbering to effect cutting of the hair uniformly across the comb.

2. A barber shears comprising two body members each having an intermediate pivot section and a cutter blade, one of said cutter blades being flexibly thin and of substantially uniform thickness throughout its cutting area and having a plane working face disposed substantially parallel to the cutting plane of said shears, said blade having a reinforcing rib extending longitudinally thereof adjacent the edge opposite the cutting edge, said rib projecting laterally in the direction of said second cutter blade, the plane working face being adapted to abut against a comb during barbering to effect cutting of the hair uniformly across the comb, and pivot means extending through the said intermediate pivot sections for securing said body members together.

3. A barber shears comprising a pair of flexibly thin cutter blades of substantially uniform cross-section, two body members each having an intermediate pivot section and an elongated support for detachably mounting one of said cutter blades along a substantial portion of its length, one of said cutter blades being proportioned and arranged to abut along one side against the intermediate pivot section and blade support of one body member, the second of said cutter blades being proportioned and arranged to abut along one side against the intermediate pivot section and along the opposite side against the blade support of said second body member, whereby said second cutter blade presents a plane working face disposed substantially parallel to the cutter plane of said shears, the plane working face being adapted to abut against a comb during barbering to effect cutting of the hair uniformly across the comb, the portions of said blades disposed in said pivot sections functioning as pivot bearings, pivot means extending through the said intermediate pivot sections and said cutter blades for detachably securing said parts together, and securing means for detachably connecting each blade to its complementary blade support.

4. A barber shears comprising two body members each having an intermediate pivot section and an elongated support for detachably mounting a flexibly thin cutter blade along a substantial portion of its length, the cutter blades being of substantially uniform cross section, the intermediate pivot section of one of said body members being recessed to the plane of the inner face of its adjoining blade support, said complementary cutter blade being proportioned and arranged to abut along one side against said recessed portion and said inner face, the intermediate pivot section of the second of said body members being recessed from the plane of the inner opposing face of its adjoining blade support a depth substantially equal to the thickness of its complementary cutter blade, said cutter blade being proportioned and arranged to abut along one side against said recessed portion and along the opposite side against said inner opposing face, whereby said cutter blade presents a plane working face disposed substantially parallel to the cutting plane of said shears, the plane working face being adapted to abut against a comb during barbering to effect cutting of the hair uniformly across the comb, pivot means extending through the recessed portions of the said intermediate pivot sections and said cutter blades for detachably securing said parts together, and securing means for detachably connecting each blade to its complementary blade support.

ANDREW J. MAY.

References Cited in the file of this patent

UNITED STATES PATENTS

| Number | Name | Date |
|---|---|---|
| 100,218 | Ulrich | Feb. 22, 1870 |
| 254,735 | Van Hoesen | Mar. 7, 1882 |
| 318,530 | Wheeler | May 26, 1885 |
| 320,940 | Lytle | June 30, 1885 |
| 359,890 | Rue | Mar. 22, 1887 |
| 1,723,756 | Zeidler | Aug. 6, 1929 |
| 1,741,803 | Zeidler | Dec. 31, 1929 |
| 1,783,583 | Ralston | Dec. 2, 1930 |
| 2,009,502 | Lambert | July 30, 1935 |
| 2,382,341 | Snell | Aug. 14, 1945 |